(12) United States Patent
Lamy et al.

(10) Patent No.: US 9,704,278 B2
(45) Date of Patent: Jul. 11, 2017

(54) VISUALIZATION DEVICE FOR DISPLAYING A RENDERED VIRTUAL OBJECT

(71) Applicant: X-Rite Switzerland GmbH, Regensdorf (CH)

(72) Inventors: Francis Lamy, Wollerau (CH); Martin Rump, Winterscheid (DE)

(73) Assignee: X-Rite Switzerland GmbH, Regensdorf (CH)

( * ) Notice: Subject to any disclaimer, the term of this patent is extended or adjusted under 35 U.S.C. 154(b) by 0 days.

(21) Appl. No.: 14/957,742

(22) Filed: Dec. 3, 2015

(65) Prior Publication Data

US 2017/0124743 A1    May 4, 2017

(30) Foreign Application Priority Data

Oct. 29, 2015    (EP) .................................... 15192098

(51) Int. Cl.
*G06T 11/60* (2006.01)
*G06T 7/00* (2017.01)

(52) U.S. Cl.
CPC ............ *G06T 11/60* (2013.01); *G06T 7/0016* (2013.01); *G06T 7/0061* (2013.01)

(58) Field of Classification Search
CPC ...... G06T 11/60; G06T 7/0061; G06T 7/0016
USPC ......................................................... 345/589
See application file for complete search history.

(56) References Cited

U.S. PATENT DOCUMENTS

| 5,726,800 | A | * | 3/1998 | Ezra | ................... | G02B 27/0093 |
| | | | | | | 348/51 |
| 7,271,378 | B2 | * | 9/2007 | Cok | ...................... | G01J 1/4204 |
| | | | | | | 250/214 AL |
| 7,425,069 | B2 | * | 9/2008 | Schwerdtner | ...... | H04N 13/0418 |
| | | | | | | 348/E13.031 |

(Continued)

OTHER PUBLICATIONS

Agus, Marco, "An Interactive 3D medical Visualization System Based on a Light Field Display", Mar. 2009, Springer-Verlag, pp. 883-893, [retrieved on Apr. 29, 2016], Retrieved from the Internet: <URL: http://link.springer.com/article/10.1007/s00371-009-0311-y>.*

Ratib, Osman, "Computer-aided Design and Modeling of Workstations and Radiology Reading Rooms for the New Millennium", Nov. 2000, RSNA, pp. 1807-1816, [retrieved on Apr. 29, 2016], Retrieved from the Internet <URL:http://pubs.rsna.org/doi/abs/10.1148/radiographics.20.6.g00nv191807>.*

(Continued)

*Primary Examiner* — Jacinta M Crawford
*Assistant Examiner* — Terrell Robinson
(74) *Attorney, Agent, or Firm* — Hahn Loeser & Parks LLP

(57) ABSTRACT

A visualization device is provided that includes an actual light box that includes an illumination array for illuminating an actual object ($O_R$) placed in the actual light box; and a rear limiting wall which functions as a screen. The device also includes a computer programmed to spatially display a virtual light box on the screen, such that the virtual light box displayed on the screen appears to form a continuous rearward extension of the actual light box. In addition, a virtual object ($O_V$) may be displayed on the screen, such that the virtual object ($O_V$) is situated in the virtual light box. The combination of an actual light box and a virtual light box allows an observer to realistically assess appearance data rendered onto a virtual object, in a direct comparison with an actual object.

23 Claims, 5 Drawing Sheets

(56) References Cited

U.S. PATENT DOCUMENTS

| | | | | |
|---|---|---|---|---|
| 7,470,044 | B2 * | 12/2008 | Maes | F21V 11/18 362/16 |
| 7,502,034 | B2 * | 3/2009 | Chemel | H05B 37/029 345/594 |
| 7,680,401 | B1 * | 3/2010 | Adelstein | A45C 9/00 396/1 |
| 2003/0057887 | A1 * | 3/2003 | Dowling | H05B 37/029 315/291 |
| 2008/0166111 | A1 * | 7/2008 | Didow | H04N 9/75 396/3 |
| 2009/0019393 | A1 * | 1/2009 | Fukushima | G06F 3/0482 715/810 |
| 2011/0202306 | A1 * | 8/2011 | Eng | A61F 4/00 702/150 |
| 2012/0169843 | A1 * | 7/2012 | Luthra | H04N 13/0051 348/43 |

OTHER PUBLICATIONS

Rocker et al., Creating Spatio-Temporal Contiguities Between Real and Virtual Rooms in an Assistive Living Enviornment, Electronic Workshops in Computing (online), Jan. 1, 2010.

Smet et al, Colour Appearance Rating of Familiar Real Objects, Color Research and Application, vol. 36, No. 3, Apr. 11, 2011, pp. 192-200.

Ellens et al, From Color to Appearance in the Real World, Material Appearance Modeling, Eurographics Association, P.O. Box 16, Aire-la-ville, CH-1288 Switzerland, Jun. 19, 2013, pp. 7-10.

Fumagalli et al, Experimental Assessment of Color-Rendering Indices and Color Appearance Under Varying Setups, Journal of Modern Optics, vol. 62, No. 1, Sep. 11, 2014, pp. 56-66.

European Search Report dated Apr. 28, 2016 for European Patent Application 15192098.0—1562.

* cited by examiner

VISUALIZATION DEVICE FOR DISPLAYING A RENDERED VIRTUAL OBJECT

BACKGROUND

1. Technical Field

The present invention relates to a visualization device. In its broadest sense, the invention falls within the field of visualizing objects or materials on a screen with the aid of computer-graphic techniques, wherein a digital representation of an actual material or of a surface of an actual object is applied to (rendered onto) a virtual object of any form, and the appearance of the virtual object simulated in this way is then displayed on the screen under user-selected illumination conditions and at user-selected observation directions.

2. Background Art

The appearance of a material is understood to mean the visual impression of a physical material, for example the surface of an object, which is given by the entirety of all its chromatic and structural as well as material properties under different illumination and observation conditions. Material properties include for example translucence. Appearance data are a digital representation of the appearance of a material. Rendering is understood to mean computer-graphically applying data which describe the appearance of a material, i.e. appearance data, to the surface of a virtual material or object, and displaying the virtual material or object. The terms "appearance", "appearance data" and "rendering" have established themselves in the relevant specialist circles and are therefore also used in the present text.

In creative applications such as, for example, product design, comprehensive databases of appearance data are required. Known examples of appearance data and/or datasets include the so-called bidirectional texture function (BTF) and the spatially varying bidirectional reflectance distribution function (SVBRDF). In order to obtain a set of appearance data such as for example a BTF or SVBRDF of an actual material and/or the surface of an actual object, a representative surface region of the object in question is colormetrically gauged pixel-by-pixel for a large number of illumination directions and observation directions, typically by using a number of digital colour cameras and a complex illumination system comprising hundreds of point light sources which are arranged in a distribution over the hemisphere above and/or below the material to be gauged.

Appearance data available for an actual material are used for visualization, i.e., graphically displaying the material on the screen, as rendered onto a virtual object of any form, under any desired illumination condition and any desired observation direction, by means of digital rendering techniques which use the appearance data as input data. Suitable rendering techniques and corresponding software are well-known in computer graphics and are not the subject of the present invention. It may merely be mentioned that such rendering techniques can extract colour values (colour reflectance values) from the appearance data for each pixel of the actual material, for any given illumination direction and any given observation direction, wherein intermediate values can be calculated by interpolating between the values contained in the appearance data.

In all practical applications of said visualization techniques, as good a match as possible between the appearance of the underlying actual material and/or object and the virtual object onto which the appearance of the actual material has been rendered is sought, and under all illumination and observation conditions. If it is assumed that the rendering techniques used are themselves sufficiently powerful, then the virtualisation quality depends primarily on the quality of the underlying appearance data. In addition, some actual materials are less suitable for simulated visualization than others. Ultimately, the virtualisation quality can only be assessed by visually comparing the underlying actual material and/or object with the virtual object, wherein however this visual comparison should as far as possible be made under controlled illumination and observation conditions.

Against this background, it is an object of the invention to provide a visualization device which enables a direct visual assessment and comparison of an actual object with a virtual object which is displayed on a screen by computer-based rendering of digital appearance data of the actual object. The visualization device is in particular desired to enable an assessment and/or comparison under controlled illumination and observation conditions.

SUMMARY

The objects on which the invention is based are solved by visualization devices in accordance with the present disclosure. Exemplary embodiments of the disclosed invention may be summarized as follows. A visualization device is provided that includes an actual light box which comprises an illumination array and a limiting wall which is a rear wall in relation to an observer. The rear limiting wall of the actual light box is embodied as a screen, and the device comprises a computer which is embodied/programmed to display a virtual light box on the screen, such that the virtual light box displayed on the screen appears to form a continuous rearward extension of the actual light box, such that the observer is given the impression that it is one contiguous light box. In addition, the computer is embodied/programmed to display at least one virtual object on the screen, such that the virtual object appears to be situated in the virtual light box.

The combination in accordance with the invention of an actual light box and a virtual light box which forms a virtual extension of the actual light box enables the observer to assess digital appearance data rendered onto a virtual object, in a direct comparison with an actual object, under extremely realistic conditions. The integrated solution in accordance with the invention allows material to be assessed without restriction, while retaining complete control over the influence of shape and light by way of a well-defined and standardised observation environment.

In accordance with one advantageous example embodiment, the actual light box comprises an actual bottom limiting wall and actual side limiting walls, and actual transition regions which are rounded in a constant or facetted way are embodied between the actual bottom limiting wall and each of the two actual side limiting walls. In addition, the virtual light box comprises a virtual bottom limiting wall and virtual side limiting walls, and virtual transition regions which are rounded in a constant or facetted way are situated between the virtual bottom limiting wall and each of the two virtual side limiting walls. In addition, the actual transition regions and the virtual transition regions appear to an observer to transition seamlessly into each other, wherein the actual transition regions are advantageously extended towards the rear and the virtual transition regions are also correspondingly extended towards the rear.

The virtual light box then advantageously comprises a virtual rear limiting wall and a virtual transition region between the virtual bottom limiting wall and the virtual rear limiting wall, and this virtual transition region is embodied to be rounded in a constant or facetted way.

The virtual light box expediently comprises virtual transition regions between the virtual rear limiting wall and the virtual side limiting walls, and these virtual transition regions are embodied to be rounded in a constant or facetted way.

The virtual transition regions between the virtual rear limiting wall and the virtual side limiting walls and the virtual bottom limiting wall are advantageously shaped as clothoids.

Due to the transition regions which are rounded (in a constant or facetted way), there is less or no noticeable parallax error in the display of the virtual light box.

An exemplary visualization device according to the present disclosure may advantageously comprise a first sensor array for detecting the position of an observer's eyes. The first sensor array and the computer are advantageously embodied/programmed to determine the height of the observer's eyes above a support base area, and the device comprises means, controlled by the computer, for adjusting the height of the actual light box above the support base area, wherein the computer is embodied/programmed to set the height of the actual light box above the support base area on the basis of the determined height of the observer's eyes above the support base area. This ensures that the observer always has the best viewing conditions, irrespective of their physical height.

In accordance with another advantageous embodiment, the first sensor array and the computer are embodied/programmed to determine the position of an observer's eyes relative to the actual light box, and the computer is embodied/programmed to adapt the perspective display of the virtual light box on the basis of the determined position of the observer's eyes, such that the virtual light box appears to the observer to display a continuous extension of the actual light box in any position of the observer.

The computer is advantageously embodied/programmed to render appearance data of an actual material or object, which are fed to it, onto a virtual object.

The computer is particularly advantageously embodied/programmed to adapt the perspective display of the virtual object on the basis of the determined position of the observer's eyes. The observer therefore always sees the actual object and the virtual object from the same perspective.

In accordance with another advantageous embodiment of the visualization device in accordance with the invention, multiple monitor profiles based on different angles of view are stored in the computer, and the computer is embodied/programmed to select or calculate a monitor profile from the stored monitor profiles and apply it, when rendering the virtual light box and the virtual object, in accordance with the determined position of the observer's eyes relative to the actual light box. Using monitor profiles which are dependent on the angle of view further enhances the display quality.

In accordance with another advantageous embodiment, the visualization device comprises a second sensor array for detecting the spatial orientation of one or more actual object(s) placed in the actual light box, and the computer is embodied/programmed to adapt the spatial orientation of the corresponding virtual object(s) to the detected spatial orientation of the actual object(s).

Advantageously, the illumination conditions in the actual light box are adjustably variable, and the computer is embodied/programmed to duplicate the illumination conditions of the actual light box in the virtual light box and to correspondingly adapt the rendering of the virtual object. The observer therefore always sees the actual object and the virtual object under the same illumination conditions.

In accordance with another advantageous embodiment, the screen is a screen which exhibits a high luminous intensity in the range of 2500 to 5000 cd/m$^2$. In accordance with another advantageous embodiment, the screen is an autostereoscopic screen.

In accordance with another advantageous embodiment, the visualization device comprises a third sensor array for detecting ambient light, and the computer is embodied/programmed to adapt the rendering of the virtual object on the basis of the detected ambient light. This enables an objective comparison of the actual object and the virtual object, independent of the ambient light.

In accordance with another advantageous embodiment, the visualization device comprises a fourth sensor array for detecting the illumination light of the actual light box, and the computer is embodied/programmed to adapt the rendering of the virtual object on the basis of the detected illumination light.

The visualization device expediently comprises compensation means which co-operate with the fourth sensor array, in order to compensate for changes in the illumination array and/or its light sources, in particular changes due to aging. This can provide and/or improve the long-term stability of the visualization device.

In one variant of the visualization device in accordance with the invention, the illumination array is formed by a screen which is controlled by the computer. This enables the illumination light to be adapted, within broad limits and in a simple way, to the respective requirements.

In another variant, the side limiting walls of the actual light box, and as applicable also its bottom limiting wall, are embodied as screens which are controlled by the computer. This allows the actual object to be illuminated on the one hand, but also on the other hand allows the virtual object to be displayed in a complete hemispherical environment, wherein a light conductor material is preferably arranged between each two adjoining screens, in order to avoid the impression of square edges. Additionally or alternatively, the screens can comprise rounded transition regions on their sides.

BRIEF DESCRIPTION OF THE DRAWINGS

In the following detailed description, the invention is described in more detail on the basis of the drawings, which show.

DETAILED DESCRIPTION OF EXEMPLARY EMBODIMENTS

The following rule applies to the description of the figures below: wherever individual reference signs are not entered in a figure, reference is made in this respect to the other figures and the corresponding parts of the description.

Figure 1:
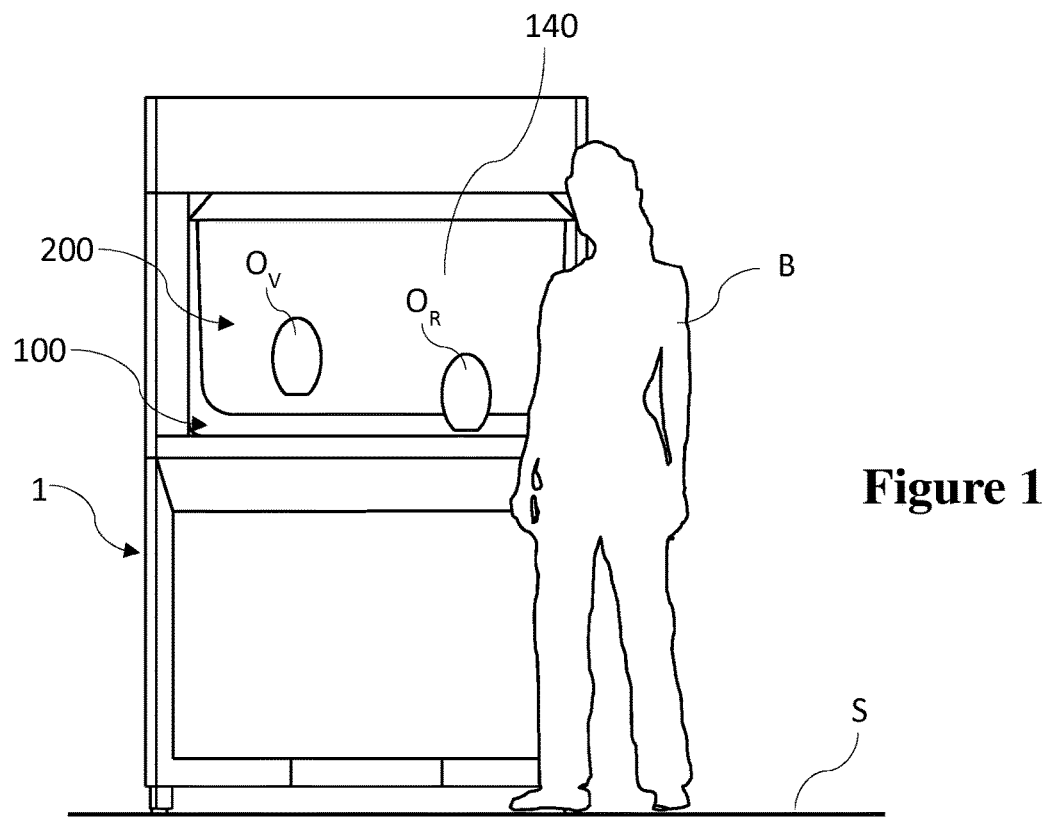
FIG. 1 a rough overview representation of the basic arrangement of an example embodiment of the visualization device in accordance with the invention.

In accordance with the representation in FIG. 1, the visualization device in accordance with the invention comprises a mounting frame 1 which in practical operation is positioned on a support base area and accommodates all the components of the device. An actual light box 100 which is open towards the front facing an observer B is arranged in the top part of the mounting frame 1. The actual light box 100 is closed off on its rear side by a screen 140. A virtual light box 200 is displayed on the screen. An actual object $O_R$ is placed in the actual light box 100, and a virtual object $O_V$ is displayed on the screen, i.e. in the virtual light box 200. The observer B can see both objects $O_R$ and $O_V$ simultaneously and visually compare them.

Figure 2:
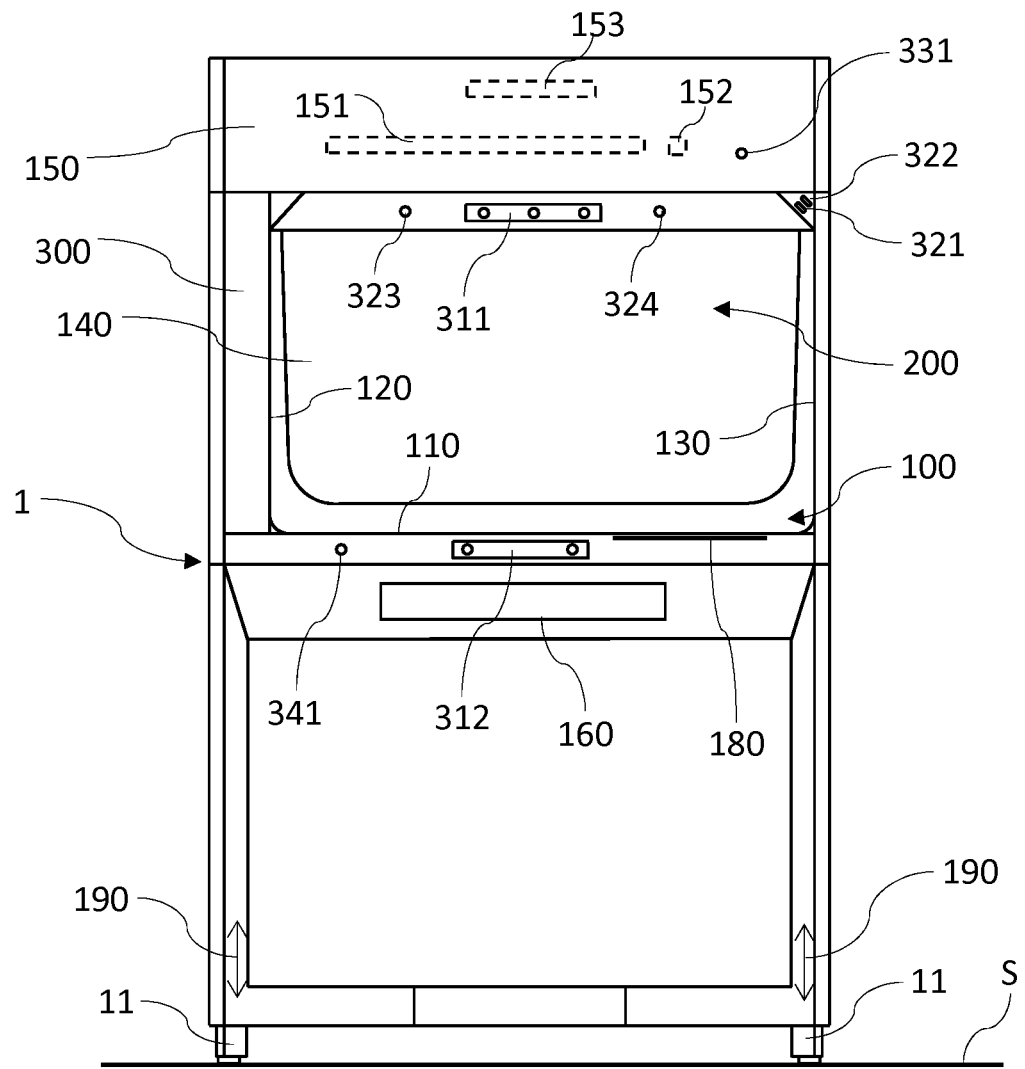
FIG. 2 a more detailed representation of the visualization device in FIG. 1.
Figure 4:
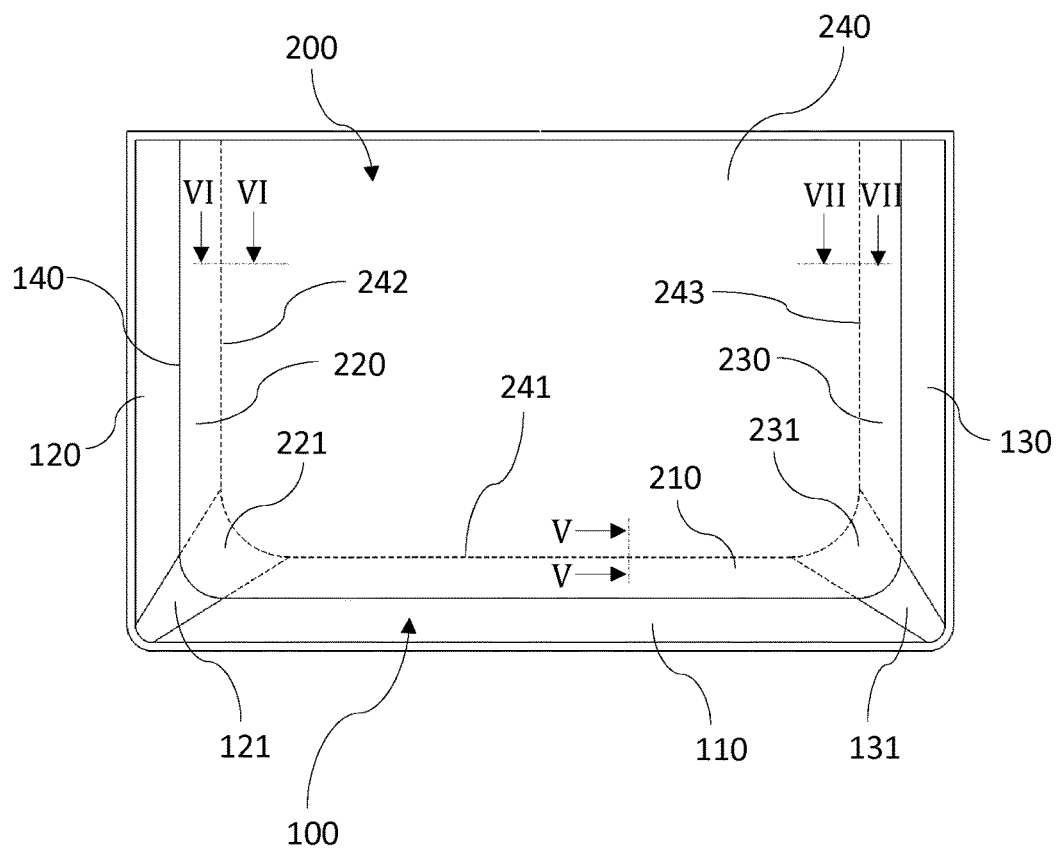
FIG. 4 a detailed view of the visualization device in FIG. 1.

FIGS. 2 and 4 show the visualization device in more detail. The actual light box 100 which is open towards the front has a bottom limiting wall 110, two side limiting walls 120 and 130 and a rear limiting wall formed by the screen 140 (FIG. 4). An illumination array 150 is situated on the top side of the light box 100 and comprises a number of light sources 151, 152, which differ in terms of their luminous intensity and colour temperature and/or spectral range and generate diffuse light and/or point light, and a controller 153 for the illumination array and/or its light sources. The illumination array 150 can alternatively also be formed by a computer-controlled screen.

The actual light box 100 is embodied in essentially the same way as known light boxes of this type and need not therefore be described in greater detail. Its illumination array 150 illuminates an actual object, which is placed in the light box, under selectable and in particular standardised illumination conditions, for example diffuse light and/or point light of a desired and in particular standardised quality.

A computer 300 is situated laterally adjacent to the actual light box 100 and controls all the components and/or functions of the visualization device. A pull-out drawer, in which a user interface 160 for the computer 300 is situated, is arranged below the actual light box 100. The user interface can for example be embodied as a tablet computer comprising a touch-sensitive screen. The computer 300 is also equipped with a data interface 170 (FIG. 3) via which data, in particular appearance data, can be fed to it from without. The computer 300 contains, as its most essential element, a rendering engine 350 (FIG. 3) for displaying the virtual light box 200 and applying appearance data to a virtual object and displaying the virtual object on the screen 140.

A turning and/or tilting table 180, which is motor-driven and can be controlled by the computer 300, for an actual object which is placed on it is arranged in the bottom limiting wall 110 of the actual light box 100.

In accordance with FIG. 2, the visualization device also comprises various sensor arrays which co-operate with the computer 300 and which are described in the following.

A first sensor array comprises two groups of sensors 311 and 312 and forms, together with the computer 300, a body and head/face recognition system. The first sensor array 311-312 and the computer 300 are embodied to determine the position of an observer's eyes. The position of the eyes is understood to mean on the other hand the height of the observer's eyes above the support base area S and on the other hand the location of the observer's eyes relative to the actual light box 100. The two sensor arrays are for example equipped with one or more cameras and infrared sensors, in a way which is known in its own right.

The mounting frame 1 is provided with legs 11 which can be extended and retracted by hydraulics or electric motors and using which the height of the actual light box 100 (and therefore also of course the height of the virtual light box 200) above the support base area S can be automatically set to an optimum value, depending on the detected and/or calculated height of the observer's eyes, by means of drive means 190 which are shown only symbolically and controlled by the computer 300, wherein the optimum value or height is to be understood to mean a height at which the observer has an unobstructed view into the light box but cannot look directly into the light sources of the illumination array 150.

The position of the observer's eyes relative to the actual light box 100 gives the spatial direction (perspective) from which the observer is looking into the actual light box 100. The computer 300 is embodied to adapt the perspective display of the virtual light box 200 and the virtual object $O_V$ displayed in it, on the basis of the detected position of the observer's eyes relative to the actual light box 100, such that the observer sees the virtual light box 200 and the virtual object $O_V$ displayed in it from the same perspective as the actual object $O_R$.

A second sensor array is formed by a number of cameras, in this case four cameras 321, 322, 323 and 324. It serves to detect the spatial orientation of an actual object $O_R$ which is placed in the actual light box 100. The computer 300 is embodied to adapt the spatial orientation of a virtual object $O_V$, which is displayed on the screen 140, to the detected spatial orientation of the actual object $O_R$.

A third sensor array 331 comprises a sensor for detecting ambient light. The sensor can be embodied as a colour measuring device which exhibits an ambient light measuring function. With the aid of the sensor 331 and the computer 300, it is possible to adapt the rendering of the virtual object $O_V$ in the virtual light box 200 on the basis of the detected ambient light.

A fourth sensor array 341 monitors the light generated by the illumination array 150 and compensates, in co-operation with the controller 153, for changes in the illumination array 150, for example changes due to ageing, in order to ensure the long-term stability of the illumination. The fourth sensor array 341 can be embodied in a similar or identical way to the sensor 331. In addition, the computer 300 is embodied to also take into account the illumination light detected by the fourth sensor array 341 and/or changes in said light, when rendering the virtual object $O_V$.

Figure 3:
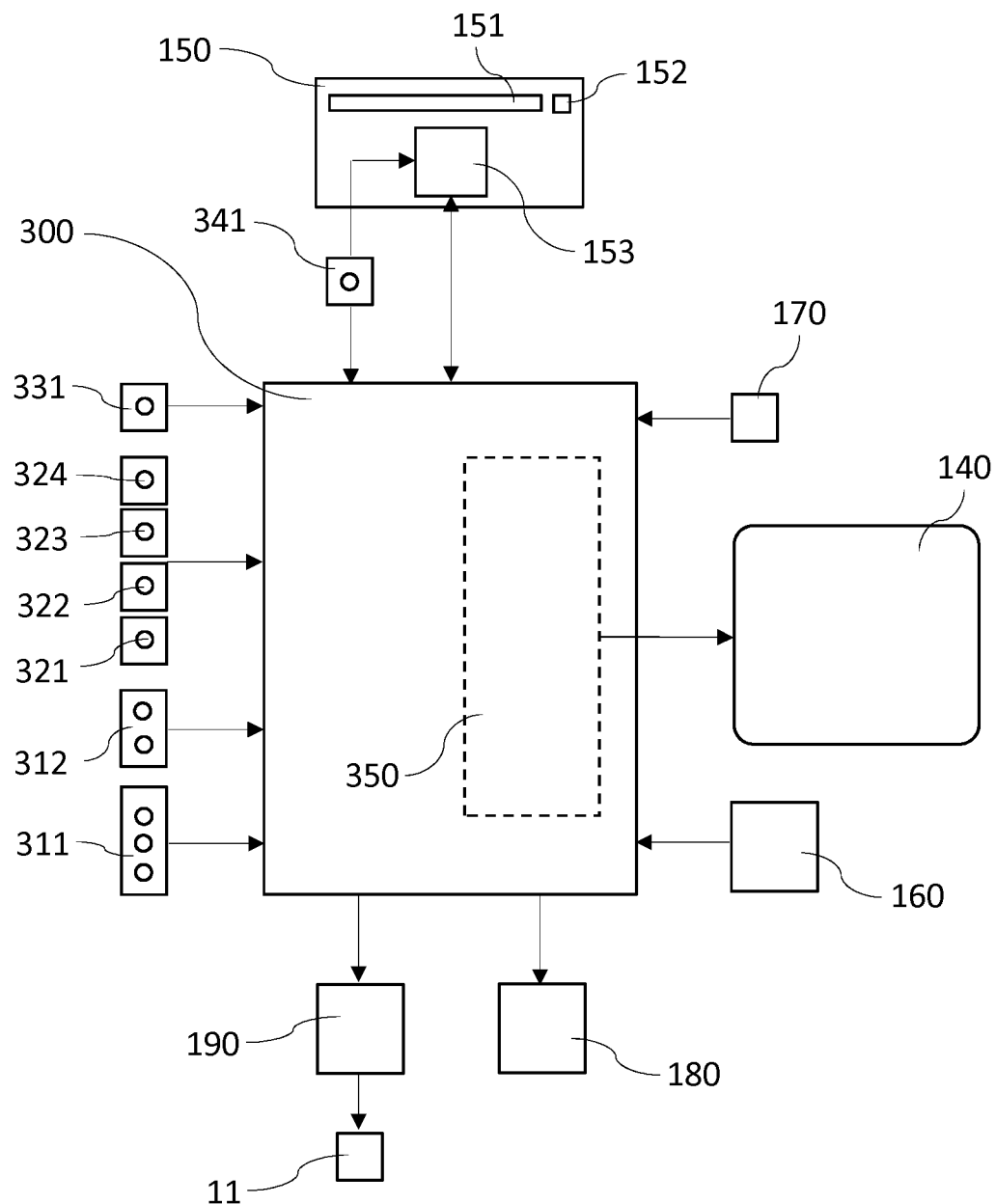
FIG. 3 a block diagram of the computer-based control of the visualization device in FIG. 1.

FIG. 3 is a block diagram showing how the components of the visualization device which have just been described interact with the computer 300.

Figure 8:
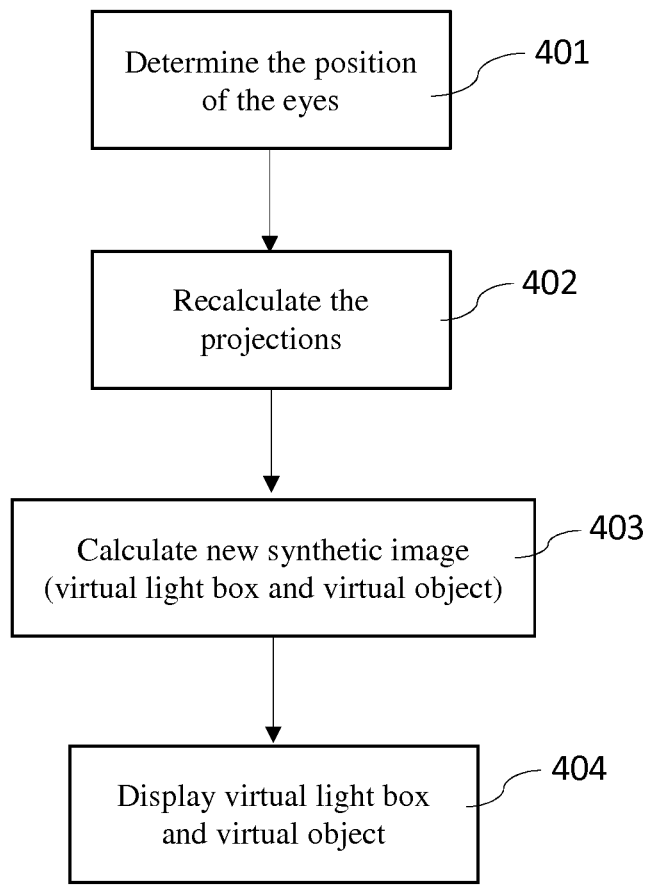
FIG. 8 a block diagram illustrating how perspective is adapted.

An important feature of the visualization device in accordance with the invention is the virtual light box 200 which can be spatially displayed on the screen 140 by the computer 300 such that it appears to the observer B as a rearward extension of the actual light box 100, i.e., the observer is given the impression of standing in front of one light box (extending further back). The virtual light box 200 is to a certain extent a virtual duplication of the actual light box 100 and is digitally stored in the computer 300. The spatial display of the virtual light box 200 on the screen 140 can be changed and/or adapted by the computer 300 in accordance with the position of the (eyes of the) observer B. To this end, the computer 300 co-operates with the eye tracking system formed by the first sensor array 311-312 and determines the position of the observer's eyes relative to the actual light box 100. This position defines the observation perspective and is used to adapt the perspective display of the virtual light box 200 in accordance with the position of the observer's eyes. To this end, and as shown by the block diagram in FIG. 8, the position of the observer's eyes (box 401) is used to recalculate the required projection (box 402), then a new synthetic image of the virtual light box is calculated (box 403) and further, this synthetic image is displayed on the screen (box 404). It may be asserted by way of anticipation that the perspective display of the virtual object $O_V$ is adapted in the same way.

As can be seen from FIG. 4 in particular, the two horizontal bottom side edges of the actual light box 100 are not square-edged but rather rounded. To this end, a rounded actual transition region 121 or 131, respectively, is embodied between the bottom limiting wall 110 of the actual light box 100 and each of the two side limiting walls 120 and 130, respectively, and is preferably—but not necessarily—extended from the front towards the rear. The curvature radius of the two actual transition regions measures for example about 55 mm at the front and for example about 105 mm immediately at the screen 140 at the rear. The two transition regions 121 and 131 are shown here in a conical shape. The transition regions can in principle also be formed by a juxtaposition of planar areas or facets which are inclined with respect to each other. The curvatures of the transition regions would not then be constant in cross-section but rather a composite of linear portions. Embodying the transition regions in this way is referred to in the following as "rounded in a facetted way".

The virtual light box 200 comprises a virtual bottom limiting wall 210, two virtual side limiting walls 220 and 230 and a virtual rear limiting wall 240. Similarly to the actual light box 100, a virtual transition region 221 or 231, respectively, which is rounded (in a constant or facetted way) is situated between the virtual bottom limiting wall 210 and each of the two virtual side limiting walls 220 and 230, respectively, wherein the virtual transition regions are preferably likewise extended towards the rear and seamlessly connect with the actual transition regions 121 and 131, respectively, of the actual light box 100. As already mentioned, the perspective display of the virtual light box 200 is always adapted by the computer 300 to the perspective defined by the position of the (eyes of the) observer. This gives the observer the impression of seeing only one light box.

Due to the actual transition regions 121 and 131 and virtual transition regions 221 and 231, respectively, which are rounded (in a constant or facetted way), the observer does not notice any (minor) parallax deviations in the projection of the virtual light box 200, which further enhances the illusion of a contiguous light box.

Figure 5:
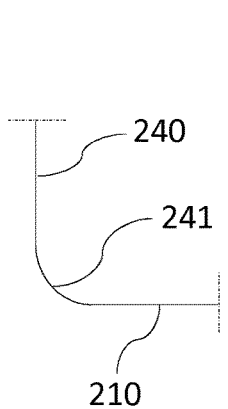
FIG. 5 a virtual detailed section in accordance with the line V-V in FIG. 4.
Figure 6:
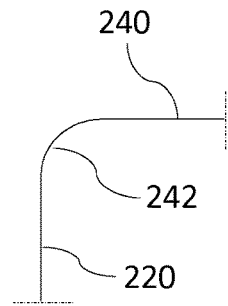
FIG. 6 a virtual detailed section in accordance with the line VI-VI in FIG. 4.
Figure 7:
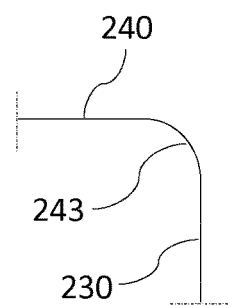
FIG. 7 a virtual detailed section in accordance with the line VII-VII in FIG. 4.

In one development, virtual transition regions 241, 242 and 243 between the virtual rear limiting wall 240 and the virtual bottom limiting wall 210 and virtual side limiting walls 220 and 230 of the virtual light box 200 can also be embodied to be rounded, as is schematically shown in FIGS. 5 to 7, wherein the three transition regions 241, 242 and 243 can preferably be shaped as clothoids.

All of the actual and/or virtual transition regions or individual actual and/or virtual transition regions can also in principle be formed by a juxtaposition of planar areas or facets which are inclined with respect to each other. The curvatures of the transition regions would not then be constant in cross-section but rather a composite of linear portions.

The computer 300 is embodied/programmed to display at least one virtual object $O_V$ of any kind on the screen 140. To this end, the corresponding data which describe the physical form of the virtual object are stored in the computer and/or can be fed to the computer from without, wherein the virtual object $O_V$ can be displayed in any orientation. In addition, the computer 300 is embodied/programmed to render appearance data of an actual object or material, which are fed to the computer or stored in the computer, onto the virtual object $O_V$, wherein the computer 300 performs the rendering under the same illumination conditions as obtain in the actual light box 100. The virtual object $O_V$ is likewise displayed in a projection (perspective) which matches the observer's perspective of an actual object $O_R$ in the actual light box 100. If the illumination conditions in the actual light box 100 are changed, they are automatically also changed in the virtual light box 200, and the changed illumination conditions are taken into account when rendering, wherein the ambient light detected with the aid of the sensor 331 can also be taken into account.

The spatial location and/or orientation of an actual object $O_R$ which is placed in the actual light box 100 can be detected by means of the cameras 321-324 and/or the second sensor array formed by them (in co-operation with the computer 300). In addition, the computer 300 is embodied/programmed to adapt the spatial orientation of a virtual object $O_V$, which is displayed on the screen 140, to the detected spatial orientation of the actual object $O_R$ in real time, i.e., to display the virtual object $O_V$ in the virtual light box 200 with the same orientation as the orientation of the actual object $O_R$ in the actual light box 100.

Monitor profiles are usually employed to achieve an optimum screen display quality. The colours and/or brightness displayed by screens are more or less dependent on the angle of view. In accordance with one advantageous development of the present invention, a number of different monitor profiles for the screen 140 being used are stored in the computer 300, wherein these monitor profiles have been produced while calibrating the screen for different vertical and horizontal angles of view. The computer 300 is embodied to select a suitable monitor profile, depending on the position of the (eyes of the) observer, and to also take into account this monitor profile when rendering the virtual light box and above all the virtual object. If a monitor profile is not available for the angle of view given by the position of the observer's eyes, then the computer 300 can also calculate a suitable monitor profile, for example, by interpolating between the stored monitor profiles for angles of view adjacent to the actual angle of view.

Figure 9:
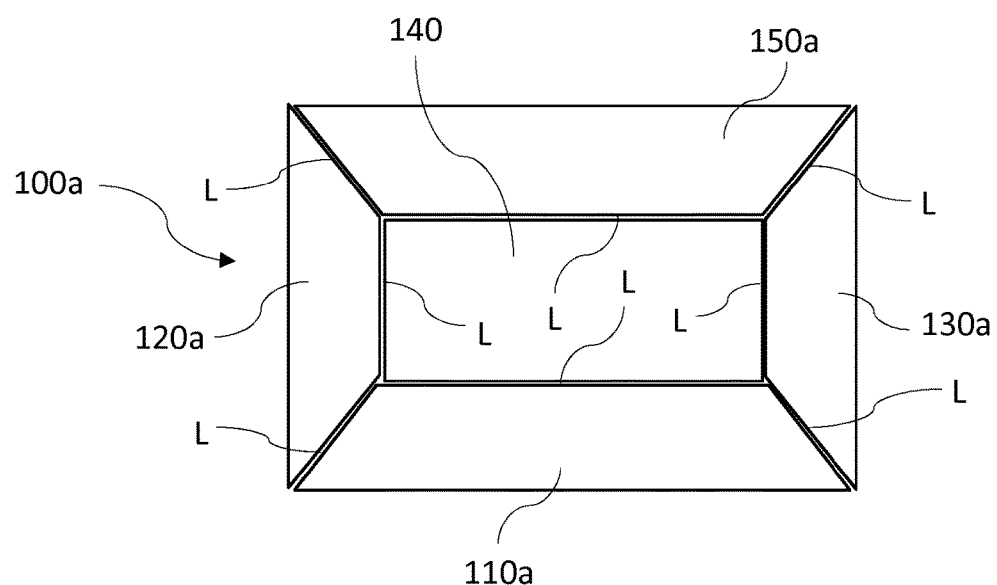
FIG. 9 a schematic sketch of a second example embodiment of the visualization device in accordance with the invention.

FIG. 9 is a sketch showing another example embodiment of the visualization device in accordance with the invention.

In this example embodiment, the top limiting wall, bottom limiting wall and side limiting walls of the actual light box 100a are embodied as screens 150a, 110a, 120a and 130a which are controlled by the computer 300. In order to avoid or at least reduce the impression of square-edged transitions between each two adjoining screens, a light conductor material L is arranged at these transitions. In one variant, only the top limiting wall and the two side limiting walls of the actual light box are formed by screens.

The screens can be embodied to be curved and/or can comprise rounded transition regions at their edges, in order to avoid square-edged transitions.

The top screen 150a and the two side screens 120a and 130a, and as applicable also the bottom screen 110a, serve on the one hand to illuminate the actual object, but also on the other hand to display the virtual object in a complete hemispherical environment or "scene" (recorded beforehand), wherein the hemisphere is correspondingly projected onto the right-angled arrangement of the screens with respect to each other, wherein rendering is performed using the selected environment to illuminate the virtual object.

Appearance rendering (illumination light, ambient light, position of observer, orientation and position of the actual object) which is synchronised in real time and adapted ensures that the observer is given a highly immersive impression and enables the quality of the appearance data and the rendering based on them to be assessed accurately and meaningfully and enables an actual material or object in the actual light box to be compared with the virtual object in the virtual light box.

Although the present invention has been described with reference to exemplary embodiments thereof, the present invention is not limited by or to such exemplary embodiments. Rather, the present invention may be implemented in various forms, as will be readily apparent to persons skilled in the art based on the disclosure provided herein.

The invention claimed is:

1. A visualization device comprising an actual light box which comprises an illumination array and a limiting wall which is a rear wall in relation to an observer, an actual bottom limiting wall and actual side limiting walls; actual transition regions which are rounded in a constant or facetted way and which are embodied between the actual bottom limiting wall and each of the two actual side limiting walls; wherein the rear limiting wall of the actual light box is embodied as a screen; and wherein the visualization device further comprises a computer which is embodied or programmed to spatially display a virtual light box on the screen, such that the virtual light box displayed on the screen appears to form a continuous rearward extension of the actual light box, the virtual light box comprising a virtual bottom limiting wall and virtual side limiting walls; virtual transition regions which are rounded in a constant or facetted way and are situated between the virtual bottom limiting wall and each of the two virtual side limiting walls; and wherein the actual transition regions and the virtual transition regions appear to transition into each other such that from the position of the observer's eyes relative to the actual light box the virtual light box and actual light box appear to form one contiguous light box in a same perspective; and wherein the computer is further embodied or programmed to display at least one virtual object on the screen, such that the virtual object is situated in the virtual light box.

2. The device according to claim 1, wherein the actual transition regions and the virtual transition regions are extended towards the rear.

3. The device according to claim 1, wherein the virtual light box further comprises a virtual rear limiting wall and a virtual transition region between the virtual bottom limiting wall and the virtual rear limiting wall; and wherein the virtual transition region is embodied to be rounded in a constant or facetted way.

4. The device according to claim 3, wherein the virtual light box further comprises virtual transition regions between the virtual rear limiting wall and the virtual side limiting walls; and wherein the virtual transition regions are embodied to be rounded in a constant or facetted way.

5. The device according to claim 3, wherein the virtual transition regions are shaped as clothoids.

6. The device according to claim 1, further comprising a first sensor array for detecting a position of the eyes of an observer.

7. The device according to claim 6, wherein the first sensor array and the computer are embodied or programmed to determine a height of the observer's eyes above a support base area; wherein the device further comprises means, controlled by the computer, for adjusting the height of the actual light box above the support base area; and wherein the computer is embodied or programmed to set the height of the actual light box above the support base area on the basis of the determined height of the observer's eyes above the support base area.

8. The device according to claim 6, wherein the first sensory array and the computer are embodied or programmed to determine the position of the eyes of an observer relative to the actual light box; and wherein the computer is embodied or programmed to adapt the perspective display of the virtual light box on the basis of the determined position of the observer's eyes, such that the virtual light box appears to display a continuous extension of the actual light box in any position of the observer.

9. The device according to claim 8, wherein the computer is embodied or programmed to adapt the perspective display of the virtual object on the basis of the determined position of the observer's eyes.

10. The device according to claim 6, wherein multiple monitor profiles based on different angles of view are stored in the computer; and wherein the computer is embodied or programmed to select or calculate a monitor profile from the stored monitor profiles and apply the selected or calculated monitor profile, when rendering the virtual light box and the virtual object, in accordance with the determined position of the observer's eyes relative to the actual light box.

11. The device according to claim 1, wherein the computer is embodied or programmed to render appearance data of an actual material, which are fed to the computer, onto a virtual.

12. The device according to claim 1, further comprising a second sensor array for detecting a spatial orientation of one or more actual object(s) placed in the actual light box; and wherein the computer is embodied or programmed to adapt the spatial orientation of the corresponding virtual object(s) to the detected spatial orientation of the actual object(s).

13. The device according to claim 1, wherein illumination conditions in the actual light box are adjustably variable; and wherein the computer is embodied or programmed to duplicate the illumination conditions of the actual light box in the virtual light box and to correspondingly adapt the rendering of the virtual object.

14. The device according to claim 1, wherein the screen exhibits a luminous intensity in the range of 2500 to 5000 cd/m$^2$.

15. The device according to claim 1, wherein the screen is an autostereoscopic screen.

16. The device according to claim 1, further comprising a third sensor array for detecting ambient light; and wherein the computer is embodied or programmed to adapt the rendering of the virtual object on the basis of the detected ambient light.

17. The device according to claim 1, further comprising a fourth sensor array for detecting an illumination light of the actual light box; and wherein the computer is embodied or programmed to adapt the rendering of the virtual object on the basis of the detected illumination light.

18. The device according to claim 17, further comprising compensation means which cooperate with the fourth sensor array, in order to compensate for changes in the illumination array.

19. The device according to claim 1, wherein the actual light box comprises a top limiting wall, which is embodied as a screen which is controlled by the computer, instead of the illumination array.

20. The device according to claim 19, further comprising a light conductor material arranged between each two adjoining screens, in order to avoid square edges.

21. The device according to claim 19, wherein the screens comprise rounded transition regions on their sides.

22. The device according to claim 1, wherein the side limiting walls of the actual light box are embodied as screens which are controlled by the computer.

23. The device according to claim 1, wherein the bottom limiting wall of the actual light box is embodied as a screen which is controlled by the computer.

\* \* \* \* \*

UNITED STATES PATENT AND TRADEMARK OFFICE
CERTIFICATE OF CORRECTION

| | | |
|---|---|---|
| PATENT NO. | : 9,704,278 B2 | Page 1 of 1 |
| APPLICATION NO. | : 14/957742 | |
| DATED | : July 11, 2017 | |
| INVENTOR(S) | : Francis Lamy and Martin Rump | |

It is certified that error appears in the above-identified patent and that said Letters Patent is hereby corrected as shown below:

Column 10, Line 40 should read:
-- virtual object --

Signed and Sealed this
Nineteenth Day of December, 2017

Joseph Matal
*Performing the Functions and Duties of the
Under Secretary of Commerce for Intellectual Property and
Director of the United States Patent and Trademark Office*